US009333962B2

(12) United States Patent
Kim et al.

(10) Patent No.: US 9,333,962 B2
(45) Date of Patent: May 10, 2016

(54) METHOD FOR DETECTING MALFUNCTION OF BRAKE SYSTEM USING YAW RATE

(71) Applicants: Hyundai Motor Company, Seoul (KR); Research & Business Foundation Sungkyunkwan University, Suwon-si (KR)

(72) Inventors: In Su Kim, Anyang-Si (KR); Ji Weon Ko, Suwon-Si (KR); Hyun Soo Kim, Gwacheon-Si (KR)

(73) Assignees: Hyundai Motor Company, Seoul (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/570,131

(22) Filed: Dec. 15, 2014

(65) Prior Publication Data
US 2015/0321655 A1 Nov. 12, 2015

(30) Foreign Application Priority Data
May 12, 2014 (KR) .......................... 10-2014-0056489

(51) Int. Cl.
*B60T 17/22* (2006.01)
(52) U.S. Cl.
CPC ....................... *B60T 17/22* (2013.01)
(58) Field of Classification Search
USPC ........ 701/70, 76, 78, 81, 22, 29.1, 33.7, 33.9; 303/122, 122.06, 152, 3
See application file for complete search history.

(56) References Cited

U.S. PATENT DOCUMENTS

| 5,775,784 A * | 7/1998 | Koga | ..................... B60L 3/0023 303/122 |
| 2013/0345913 A1* | 12/2013 | Krueger | ..................... B60T 1/10 701/22 |

FOREIGN PATENT DOCUMENTS

| JP | 11-170991 A | 6/1999 |
| JP | 2001-018781 (A) | 1/2001 |
| JP | 2005-168184 A | 6/2005 |

(Continued)

OTHER PUBLICATIONS

Ko et al., "Development of Fail Safe Control Algorithm for Electric Vehicle Braking System," *School of Mechanical Engineering, Sungkyunkwan University, Hyundai Motor Company*, p. 1838 and two pages of attachments.

*Primary Examiner* — Adam Tissot
(74) *Attorney, Agent, or Firm* — Morgan, Lewis & Bockius LLP

(57) ABSTRACT

A method for detecting a malfunction of a brake system may include measuring a deceleration/acceleration upon braking and determining whether the brake system has the malfunction by comparing the measured deceleration/acceleration and a required deceleration/acceleration. If it is determined that the brake system has the malfunction, the method further includes determining whether a braking interval is an interval where braking is performed only through regenerative braking. If so, the method determines that a regenerative brake system has the malfunction. If not, the method further includes determining whether a left friction brake system or a right friction brake system has the malfunction by measuring a yaw rate value and determining whether a front wheel friction brake system or a rear-wheel friction brake system has the malfunction by using a variation amount of a measurement value of the deceleration/acceleration.

7 Claims, 6 Drawing Sheets

(56) References Cited

FOREIGN PATENT DOCUMENTS

| | | |
|---|---|---|
| JP | 2006-027545 (A) | 2/2006 |
| JP | 2008-137618 A | 6/2008 |
| KR | 10-1259361 B1 | 4/2013 |
| KR | 10-2014-0032703 (A) | 3/2014 |

\* cited by examiner

METHOD FOR DETECTING MALFUNCTION OF BRAKE SYSTEM USING YAW RATE

CROSS-REFERENCE TO RELATED APPLICATION

The present application claims priority of Korean Patent Application Number 10-2014-0056489 filed on May 12, 2014, the entire contents of which application are incorporated herein for all purposes by this reference.

BACKGROUND OF INVENTION

1. Field of Invention

The present disclosure relates to methods for detecting a malfunction of a brake system using a yaw rate. More particularly, it relates to a method for detecting a malfunction of a brake system of a vehicle, which performs regenerative braking and friction braking in vehicles that are driven by a motor, such as a hybrid vehicle and an electric vehicle.

2. Description of Related Art

A hybrid vehicle and an electric vehicle have a motor driven by electric energy mounted thereon and is a next-generation environmental vehicle driven by the motor. Therefore, a regenerative braking scheme through the motor is applied to the hybrid vehicle and the electric vehicle in addition to the existing friction braking scheme.

An algorithm for determining a malfunction of a brake system which is configured in the related art cannot be used in the vehicle adopting the regenerative braking scheme and a separate control algorithm for determining a malfunction of a brake system of the hybrid vehicle and the electric vehicle is required.

Japanese Patent Application Laid-Open No. 1999-170991 discloses a technology that detects a deceleration of a vehicle and determines a malfunction of an electric brake by a central brake controller when the detected deceleration of the vehicle is smaller than a reference value.

However, in the Japanese Patent Application Laid-Open, since the central brake controller determines the malfunction of the electric brake, the malfunction of the brake system cannot be determined when the central brake controller cannot be normally operated. Moreover, it cannot be determined which brake system of a regenerative brake system or a friction brake system has the malfunction when the brake system has the malfunction. Further, when the malfunction in the friction brake system is detected, a malfunction target brake system among the friction brake systems cannot be determined.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present disclosure has been made in an effort to solve the above-described problems associated with prior art and/or other problems. When a malfunction occurs in a brake system, a fail safe for compensating for required braking force by a driver is applied. Since logic for determining the malfunction of the brake system plays an important role in order to apply the fail safe, it is determined whether the brake system has the malfunction by receiving a malfunction signal of the brake system through a central brake controller.

However, since it cannot be determined whether the brake system has the malfunction in a vehicle in which a malfunction determination signal of a sub brake controller mounted on each wheel cannot be used, the fail safe capable of compensating for the required braking force by the driver cannot be applied. Therefore, a method is required, which can determine the malfunction by using other sensors previously mounted without receiving a malfunction determination signal of the sub brake controller mounted on each wheel.

Moreover, since a regenerative braking scheme is applied to hybrid vehicles and electric vehicles, separate logic for determining whether the brake system has the malfunction is required unlike the vehicle having a friction brake system. Additionally, designing detailed logic for determining which brake system has the malfunctions among friction brake systems is required.

The present disclosure is to provide a technology that can determine any one of the regenerative brake system and the friction brake system, for example, a malfunction target brake system when the friction brake system has the malfunction, without using the malfunction determination signal of the brake system.

In one aspect, the present disclosure provides a method capable of determining a malfunction target brake system, which calculates a required acceleration/deceleration upon braking a vehicle depending on a brake pedal input and measures an actual acceleration/deceleration of the vehicle, in braking a hybrid vehicle or an electric vehicle to determine whether a difference between the required acceleration/deceleration and the actual acceleration/deceleration is more than a predetermined range, and thus measurers variations in yaw rate value and acceleration/deceleration according to operation conditions of a regenerative brake system, a regenerative brake and rear-wheel friction brake system, and a regenerative brake and front-wheel and rear-wheel friction brake system to determine whether a regenerative brake system and a friction brake device have malfunctions and determine a malfunction target brake system when the friction brake system has the malfunction.

According to the present disclosure, it is determined which brake system of the regenerative brake system and the friction brake system have a malfunction when a brake system has the malfunction and when it is detected that the friction brake system has the malfunction, a malfunction target brake system can be determined.

In the case where it is determined that the brake system has the malfunction, a fail safe can be applied, which can compensate for the braking force through the brake systems which are normally operated except for the brake system which has the malfunction so as to compensate for braking force as large as a difference between braking force required for a vehicle in which all brake systems are normally performed and braking force which can be performed when the brake system has the malfunction.

The present disclosure provides a method that can determine the malfunction of the brake system. Therefore, the present disclosure does not use a malfunction determination signal received by a central brake control system.

The malfunction of the brake system may be determined by analyzing variations in values of a deceleration/acceleration sensor and a yaw rate sensor mounted on the vehicle and it may be determined whether the brake system has the malfunction in a hybrid vehicle and an electric vehicle without installing a separate control device. Accordingly, since the separate control device is not used, an economic effect can be achieved.

In various aspects, the present disclosure provides a method, including: measuring a deceleration/acceleration upon braking a vehicle and determining whether the brake system has the malfunction by comparing the measured deceleration/acceleration and a required deceleration/acceleration. If it is determined that the brake system has the malfunction, the determining of whether the brake system has the malfunction further includes: a1) determining whether a braking interval is an interval where braking is performed only through regenerative braking; a2) if the braking interval is the interval where braking is performed only through regenerative braking, determining that a regenerative brake system has the malfunction; and a3) if the braking interval is not the interval where braking is performed only through regenerative braking, determining whether a left friction brake system or a right friction brake system has the malfunction by measuring a yaw rate value and determining whether a front wheel friction brake system or a rear-wheel friction brake system has the malfunction by using a variation amount of a measurement value of the deceleration/acceleration.

In the determining of whether the brake system has the malfunction, if a difference value between the required deceleration/acceleration upon braking and the measured deceleration/acceleration is equal to or more than a predetermined range, it is determined that the brake system has the malfunction. The braking interval is divided into a regenerative braking interval, a regenerative braking and rear-wheel friction braking interval, and a regenerative braking and front and rear-wheel friction braking interval.

If it is determined that the brake system has the malfunction, the determining of whether the brake system has the malfunction further includes: b1) determining whether the braking interval is a regenerative braking and rear-wheel friction braking interval; b2) if the braking interval is the regenerative braking and rear-wheel friction braking interval, measuring the yaw rate value; b3) if the yaw rate value is 0, determining that the regenerative brake system has the malfunction; b4) if the yaw rate value is larger than 0, determining that the rear-wheel right friction brake system has the malfunction; and b5) if the yaw rate value is smaller than 0, determining that the rear-wheel left friction brake system has the malfunction.

If it is determined that the brake system has the malfunction, the determining of whether the brake system has the malfunction further includes: c1) determining whether the braking interval is a regenerative braking and front and rear-wheel friction braking interval; c2) if it is determined that the braking interval is the regenerative braking and front and rear-wheel friction braking interval, measuring the yaw rate value; c3) if the yaw rate value is 0, determining that the regenerative brake system has the malfunction; and c4) if the yaw rate value is larger than 0, determining whether the front-wheel right friction brake system or the rear-wheel right friction brake system has the malfunction, wherein the determining of whether the front-wheel right friction brake system or the rear-wheel right friction brake system has the malfunction includes: determining whether a front-wheel friction braking force and a rear-wheel friction braking force are substantially the same; If it is determined that the front-wheel friction braking force and the rear-wheel friction braking force are substantially the same, determining whether the deceleration/acceleration varies depending on a variation in the front-wheel right braking force; if it is determined that the deceleration/acceleration varies depending on the variation in the front-wheel right braking force, determining that the rear-wheel right friction brake system has the malfunction; and if it is determined that the deceleration/acceleration does not vary depending on the variation in the front-wheel right braking force, determining that the front-wheel right friction brake system has the malfunction.

The determining of whether the front-wheel right friction brake system or the rear-wheel right friction brake system has the malfunction further includes: if the front-wheel friction braking force and the rear-wheel friction braking force are not the same, determining whether the deceleration/acceleration actually reduced through braking and the deceleration/acceleration generated by the front-wheel right friction brake system are substantially the same; If the deceleration/acceleration actually reduced through braking and the deceleration/acceleration generated by the front-wheel right friction brake system are substantially the same, determining that the rear-wheel right friction brake system has the malfunction; and if the deceleration/acceleration actually reduced through braking and the deceleration/acceleration generated by the front-wheel right friction brake system are not the same, determining that the front-wheel right friction brake system has the malfunction.

If the yaw rate value is smaller than 0, the determining of whether the brake system has the malfunction further includes: determining whether the front-wheel left friction brake system or the rear-wheel left friction brake system has the malfunction, wherein if it is determined that the front-wheel friction braking force and the rear-wheel friction braking force are substantially the same, the determining of whether the front-wheel left friction brake system or the rear-wheel left friction brake system has the malfunction includes: determining that the rear-wheel left friction brake system has the malfunction if the deceleration/acceleration varies depending on the variation in the front-wheel left braking force, and determining that the front-wheel left friction brake system has the malfunction if the deceleration/acceleration does not vary depending on the variation in the front-wheel left braking force.

If it is determined that the front-wheel friction braking force and the rear-wheel friction braking force are not the same, the determining of whether the front-wheel left friction brake system or the rear-wheel left friction brake system has the malfunction includes: determining whether the deceleration/acceleration actually reduced through braking and the deceleration/acceleration generated by the front-wheel left friction brake system are substantially the same, if the deceleration/acceleration actually reduced through the braking and the deceleration/acceleration generated by the front-wheel left friction brake system are substantially the same, determining that the rear-wheel left friction brake system has the malfunction, and if the deceleration/acceleration actually reduced through the braking and the deceleration/acceleration generated by the front-wheel left friction brake system are not the same, determining that the front-wheel left friction brake system has the malfunction.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present disclosure will now be described in detail with reference to certain embodiments thereof illustrated in the accompanying drawings which are given hereinbelow by way of illustration only, and thus are not limitative of the present disclosure, and wherein.

Figure 1:
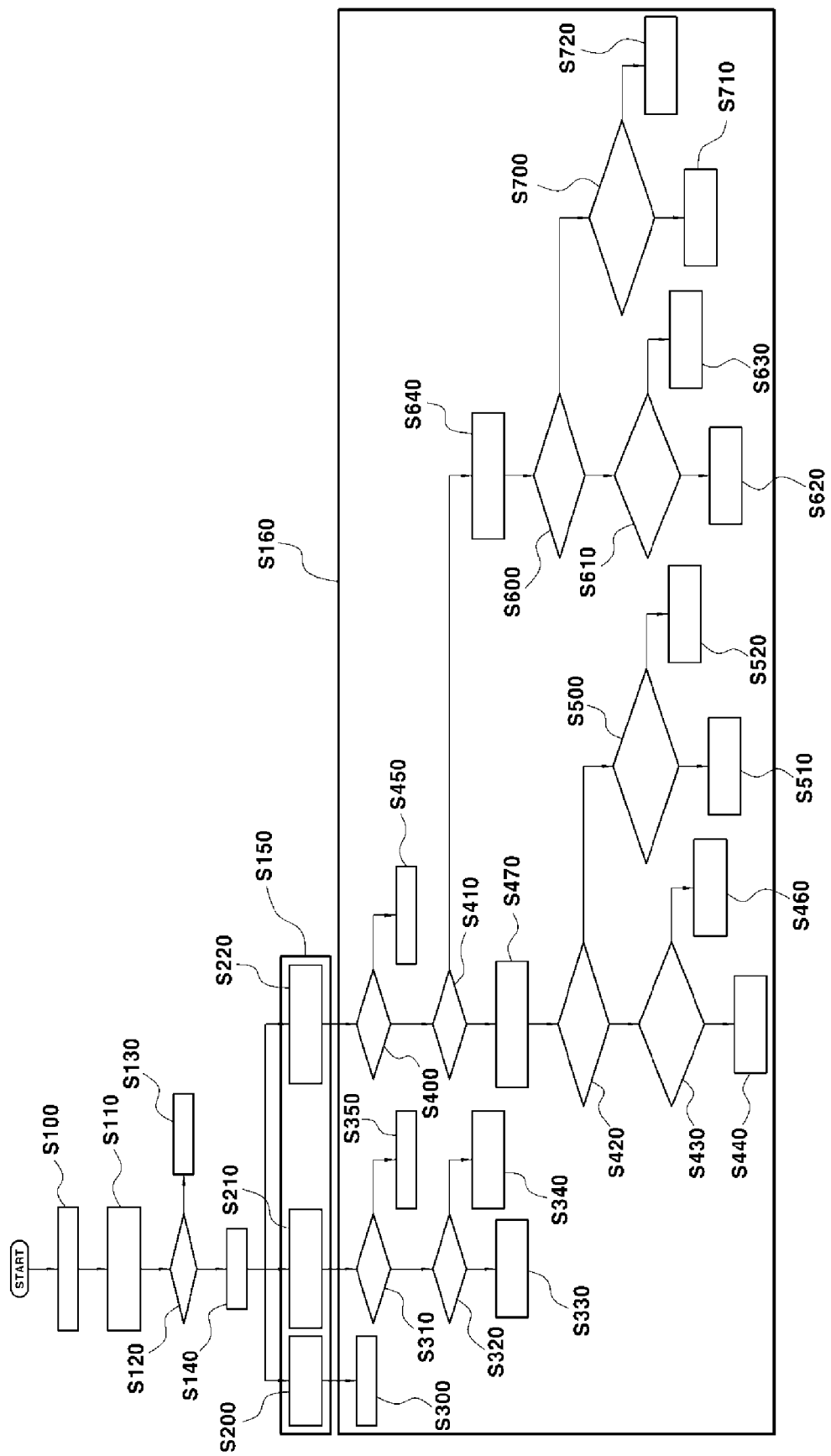
FIG. 1 is a flowchart schematically illustrating a method for detecting a malfunction of a brake system using a yaw rate.
Figure 2A:
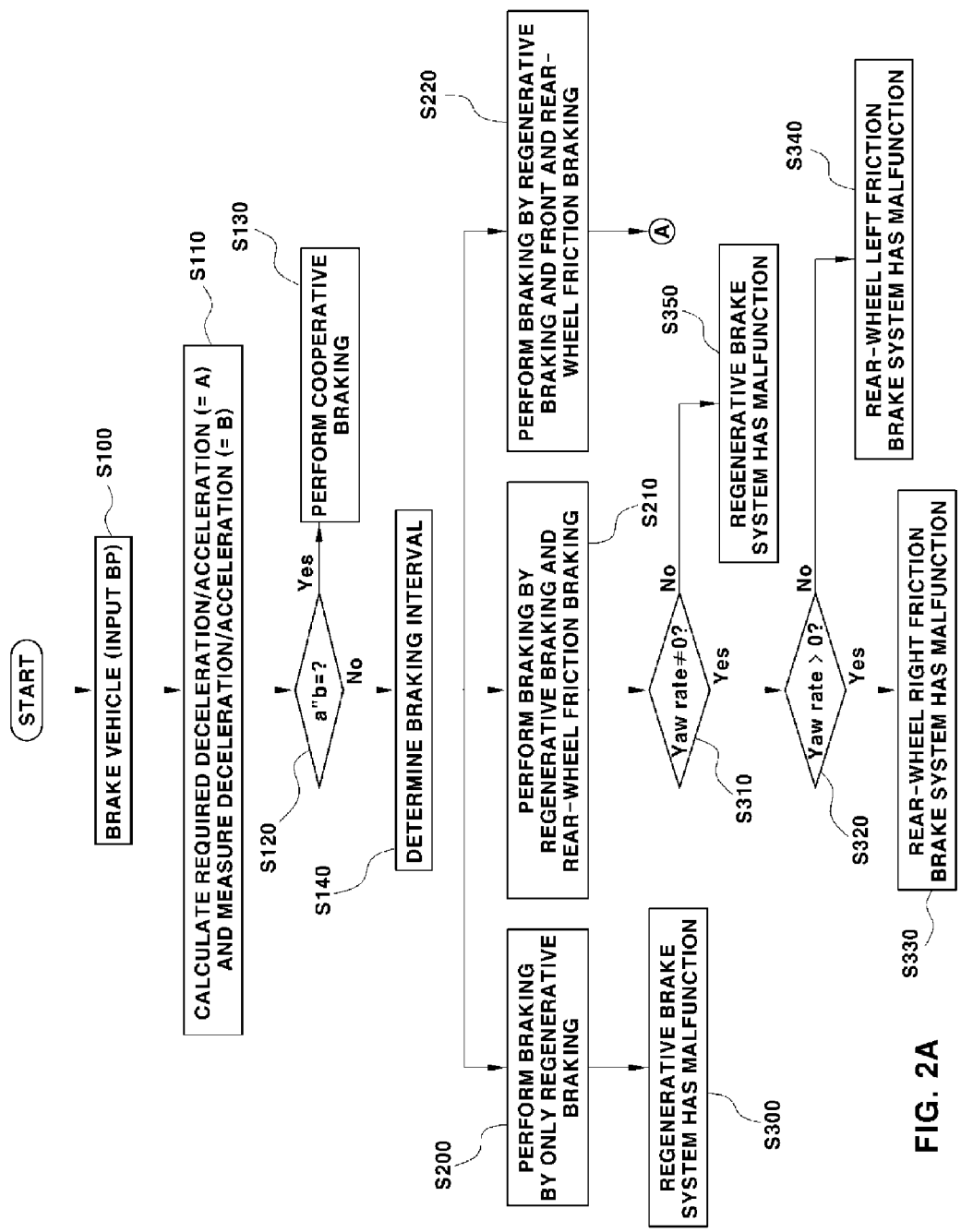
FIGS. 2A, 2B, and 2C are flow charts schematically illustrating the method for detecting a malfunction of a brake system depending on respective braking steps of FIG. 1.
Figure 2B:
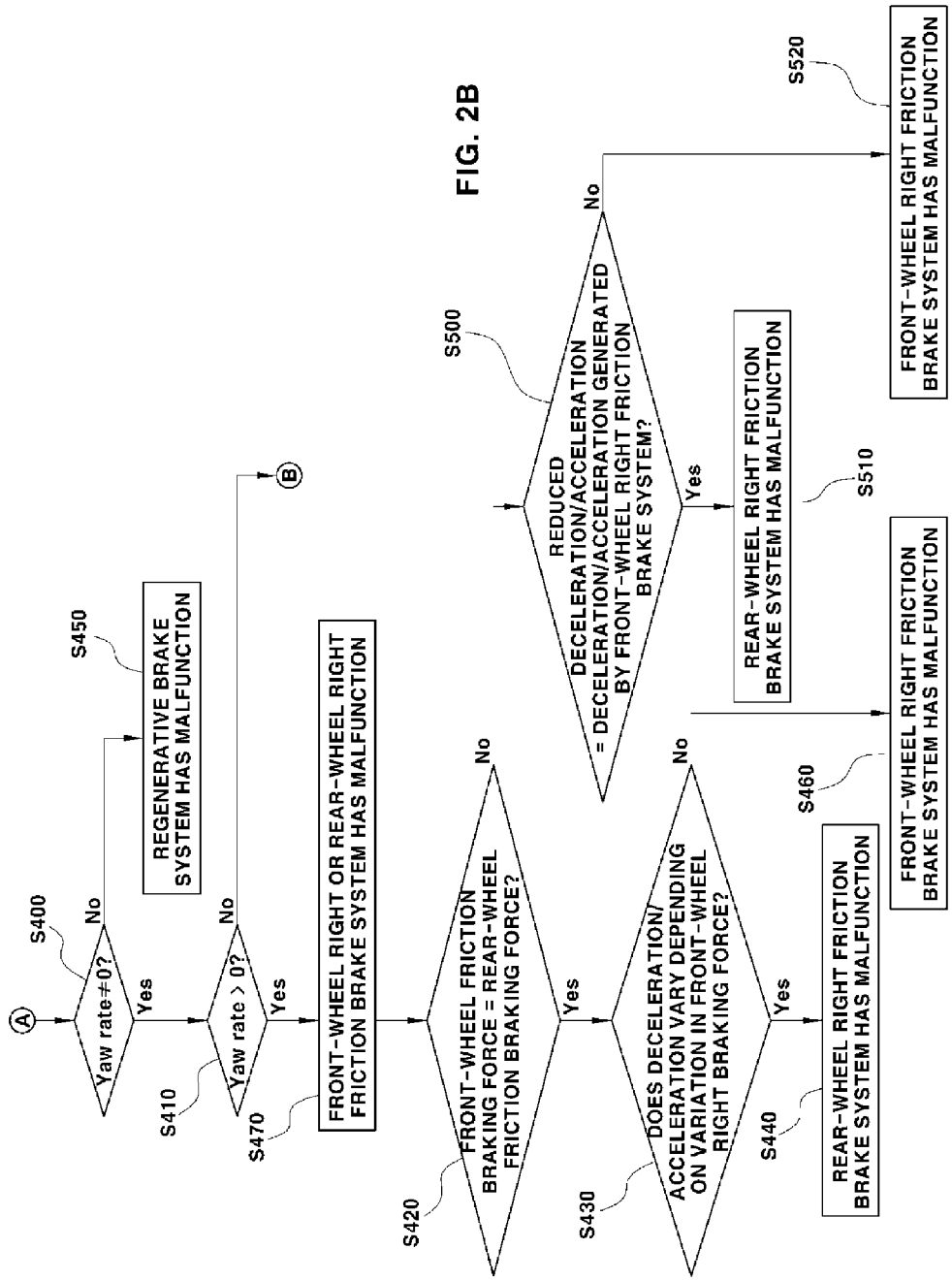
Figure 2C:
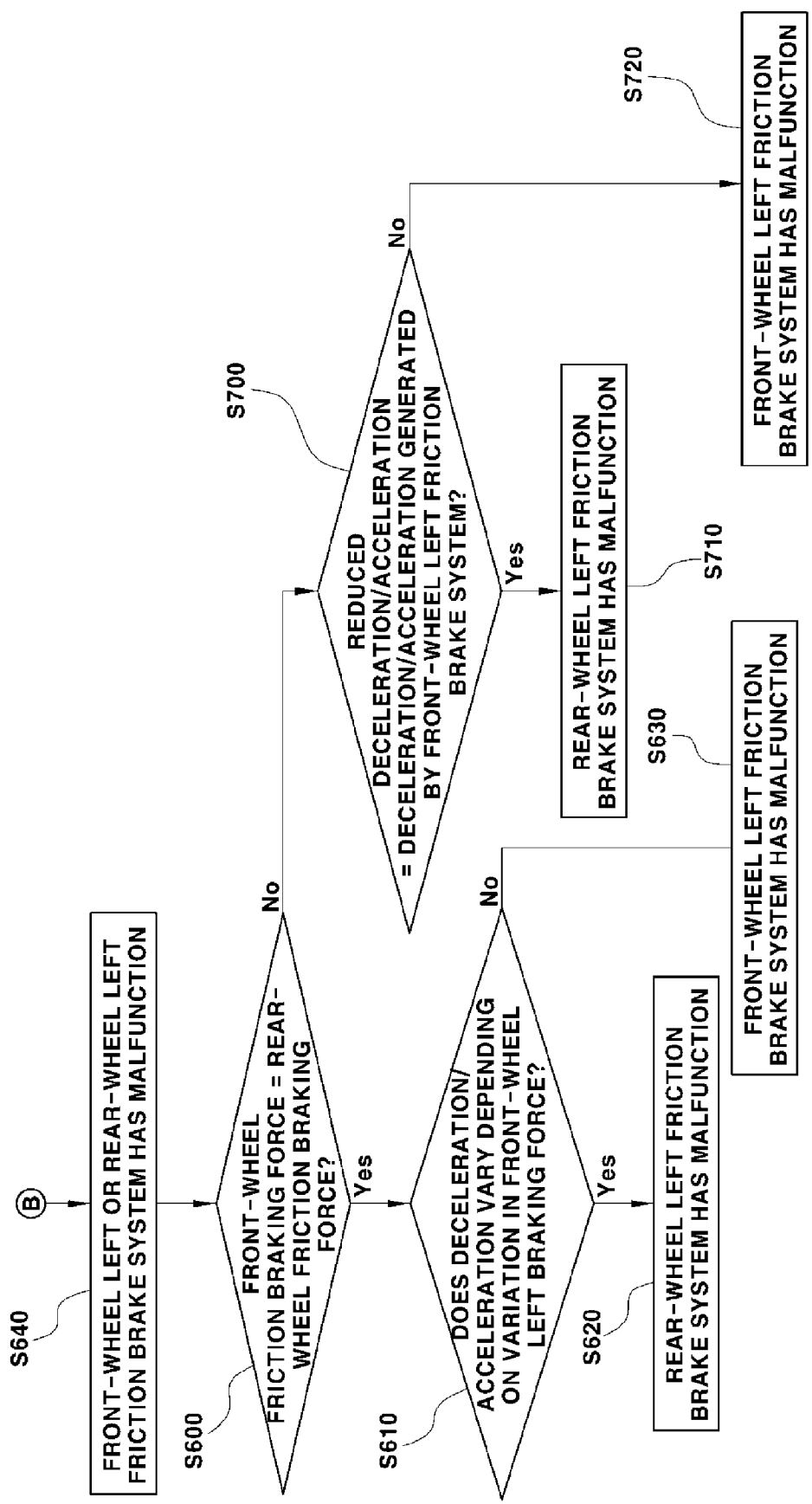

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, preferred embodiments of a method for detecting a malfunction of a brake system using a yaw rate according to the present disclosure will be described in detail with reference to the accompanying drawings.

However, in the case of determining a malfunction of a left or right brake system by determining yaw rate according to a sequence of determining a braking interval and a malfunction of a brake system defined through various embodiments and in the case of determining the malfunction of a front-wheel or rear-wheel brake system by determining a deceleration/acceleration are not limited to a time-series sequence. Therefore, it should be analyzed that a protection scope influences an equivalent scope.

In the case of a hybrid vehicle and an electric vehicle, braking is performed by using a regenerative brake system and a friction brake system in a braking step, and as a result, in the case of the hybrid vehicle, determining whether the friction brake system has a malfunction and whether the regenerative brake system has the malfunction is required through regenerative braking.

Therefore, in order to apply a fail safe configured depending on the malfunction of the brake system of the hybrid vehicle, the determination of the malfunction of the brake system should be preceded and required braking force may be compensated through a brake system that is normally operated after malfunctions of some brake systems are determined.

In the case of the hybrid and electric vehicles, a brake system used when the vehicle is braked is determined according to a braking interval. That is, as an input value of a brake pedal increases, the required braking force increases. Therefore, the braking interval is divided. During an interval in which the required braking force is low, braking is performed by using only the regenerative brake system. When braking force which is equal to or higher than the braking force generated by the regenerative brake system is required, braking is achieved through a rear-wheel friction brake system together with the regenerative brake system. Moreover, when braking force is required, which is higher than the braking force generated by the regenerative brake system and the rear-wheel friction brake system, braking is performed by the regenerative brake system and the front and rear-wheel friction brake systems. Therefore, the braking interval represents intervals in which the brake systems of the vehicle perform braking respectively or in parallel to each other by determining the required braking force depending on an input of the brake pedal and determining operations of the respective brake systems so as to satisfy the required braking force.

The present disclosure provides a method for determining a malfunction of a brake system through a change in yaw rate value and/or a change in deceleration/acceleration.

The yaw rate is also referred to as a yaw angular velocity and represents a velocity in which a rotational angle is changed around a vertical line that passes through the center of an automobile. Therefore, when the rotational angle of the vehicle is changed, a yaw rate sensor measures a change value of the rotational angle of the vehicle.

Figure 3:
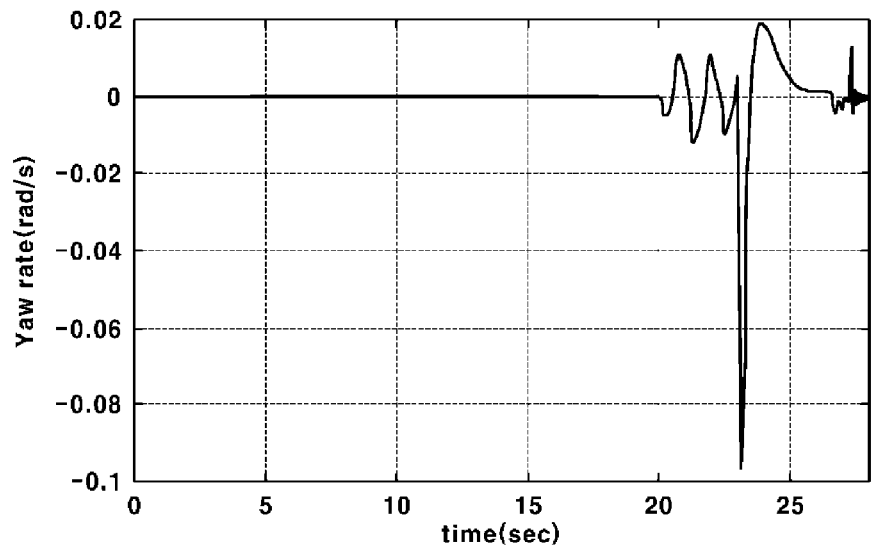
FIG. 3 is a graph in which a yaw rate value decreases to a negative value at the moment when a friction brake system at a left side of a front wheel has a malfunction.
Figure 4:
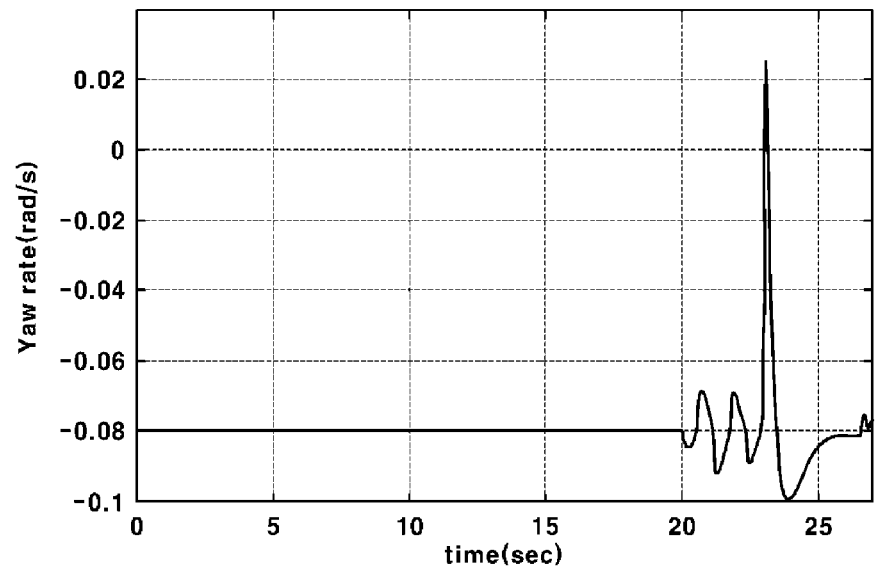
FIG. 4 is a graph in which the yaw rate value increases to a positive value at the moment when the friction brake system at a right side of the front wheel has the malfunction.
Figure 5:
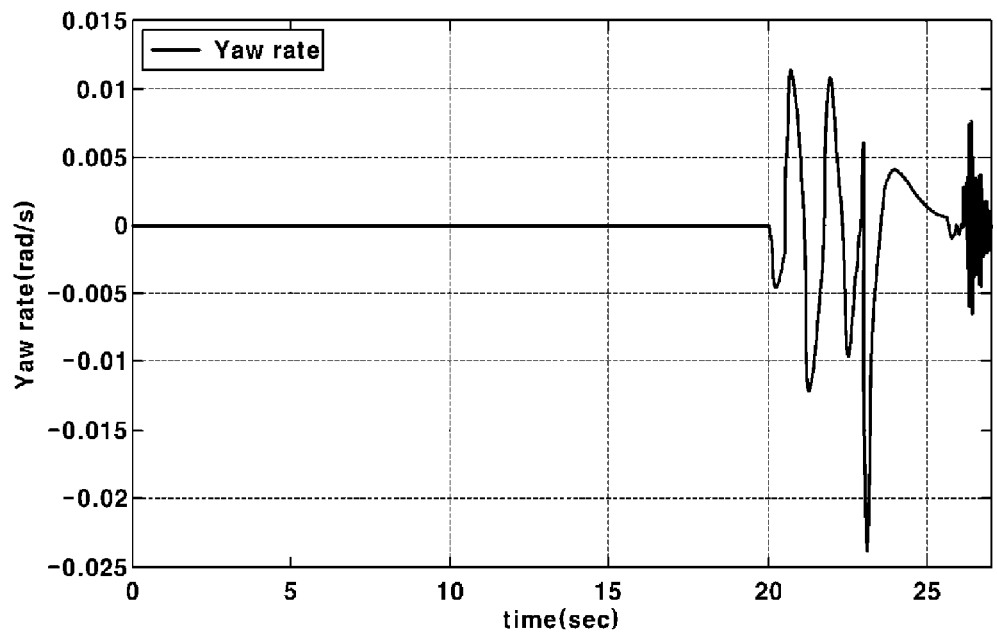
FIG. 5 is a graph in which a yaw rate value decreases to a negative value at the moment when the friction brake system at a left side of a rear wheel has the malfunction.
Figure 6:
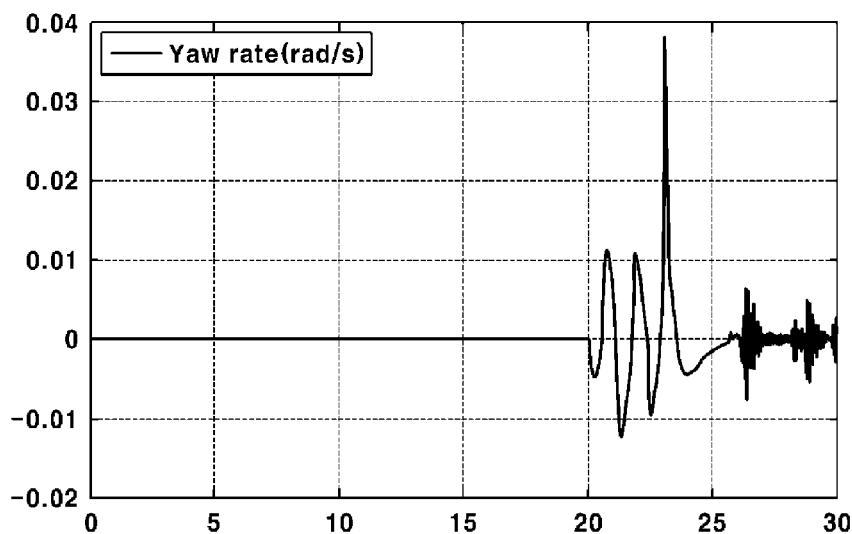
FIG. 6 is a graph in which the yaw rate value increases to a positive value at the moment when the friction brake system at a right side of the rear wheel has the malfunction.

Accordingly, due to a change in measurement value of the yaw rate sensor when each friction brake system has a malfunction, when front-wheel left friction brake systems have a malfunction (e.g., S630, S710) and rear-wheel left friction brake systems have a malfunction (e.g., S620, S720), the yaw rate value suddenly decreases to a negative value. This case is illustrated through a change in the yaw rate value in FIGS. 3 and 5. When front-wheel right friction brake systems have a malfunction (e.g., S510, S460) and rear-wheel right friction brake systems have a malfunction (e.g., S520, S440), the yaw rate value suddenly increases to a positive value. This case is illustrated through a change in the yaw rate value in FIGS. 4 and 6. However, the yaw rate value is 0 when the regenerative braking is performed (e.g., S350, S450).

As described above, whether the right or left brake system of the vehicle has a malfunction may be determined through the yaw rate sensor.

A deceleration/acceleration sensor is a sensor in a control system that measures a variation amount of the deceleration/acceleration of the vehicle.

The malfunction of the brake system of a front wheel or a rear wheel of the vehicle may be determined through the deceleration/acceleration sensor (e.g., S430, 5500, S610, S700). That is, an actual deceleration/acceleration amount of the vehicle may be measured through the deceleration/acceleration sensor, a variation value of the deceleration/acceleration depending on the braking force generated by the respective brake systems is measured and the brake system having braking force equal to or lower than the required braking force is detected by comparing the measured actual deceleration/acceleration of the vehicle and the deceleration/acceleration value depending on the braking force generated by the respective brake systems to determine the malfunction of the brake system of the front wheel or the rear wheel.

In various embodiments of the present disclosure, whether the left or right friction brake system has the malfunction may be determined by measuring the yaw rate value and the malfunction of brake systems of the front wheel and the rear wheel may be determined by measuring the variation of the actual deceleration/acceleration value of the vehicle.

Hereinafter, a method for detecting a malfunction of a brake system according to the present disclosure will be described through the embodiment.

The method is a method in which the malfunction of the brake system is determined by comparing a calculation value of the required deceleration/acceleration depending on the input of the brake pedal in a driving step of the vehicle and a deceleration/acceleration sensor value of the vehicle and when it is determined that the brake system has the malfunction, it is determined which system has the malfunction among the respective brake systems based on a braking interval area.

When a difference value between the required deceleration/acceleration depending on the input of the brake pedal and the actual deceleration/acceleration is more than a predetermined range (e.g., S120), it is determined that the brake system has the malfunction.

Thereafter, a regenerative braking interval, a regenerative braking and rear-wheel friction brake interval (e.g., S210), and a regenerative braking and front/rear-wheel friction braking interval (e.g., S220) are determined according to a braking interval to detect which brake system has the malfunction among the respective brake systems. In this regard, the malfunction of the left or right brake system may be detected through the yaw rate value and furthermore, whether the brake system of the front wheel or the rear wheel has the malfunction may be detected through the variation of the deceleration/acceleration measurement value and the braking force of the respective brake systems. When only the regenerative brake system is used in performing braking (e.g., S200), the malfunction of the brake system is detected by the malfunction of the regenerative brake system (e.g., S300). Further, except for braking interval in which only the regenerative brake system is used, when the yaw rate value is 0, it may be determined that the regenerative brake system has the malfunction (e.g., S350, S450).

During an interval in which braking is performed by the regenerative braking system and rear-wheel friction brake system in the braking interval, when a value larger than 0 is measured as the yaw rate value (e.g., S320), the malfunction of the rear-wheel right friction brake system is determined (e.g., S330) and when a value smaller than 0 is measured as the yaw rate value, the malfunction of the rear-wheel left friction brake system is detected (e.g., S340).

During the regenerative braking and front/rear-wheel friction braking interval in the braking interval (e.g., S220), the vehicle performs braking by using the regenerative brake system and the front/rear-wheel friction brake system. The yaw rate value is measured when the vehicle is braked to determine which brake system has the malfunction between the left and right brake systems of the friction brake system. That is, when the yaw rate value is larger than 0, it is determined that the front-wheel right or rear-wheel right brake system has the malfunction and when the yaw rate value is smaller than 0, it is determined that the front-wheel left or rear-wheel left brake system has the malfunction.

Whether the left or right brake system has the malfunction is determined through the yaw rate value and thereafter, it is determined whether the front-wheel friction braking force and the rear-wheel friction braking force are the same or substantially the same as each other in order to detect whether the front-wheel or rear-wheel brake system has the malfunction. In this regard, when general friction braking is performed, front-wheel friction braking force provides the larger braking force than the rear-wheel friction braking force, but the front-wheel friction braking force may have the same or substantially the same value as the rear-wheel friction braking force during an interval in which regenerative braking is performed concurrently.

Accordingly, when the front-wheel friction braking force is the same or substantially the same as the rear-wheel friction braking force, it may not be determined which brake system has the malfunction by comparing a deceleration/acceleration value actually reduced by braking the vehicle and the variation of the deceleration/acceleration depending on the change of the braking force of the friction brake system. Accordingly, under a condition in which the front-wheel friction braking force and the rear-wheel friction braking force are the same or substantially the same as each other, it may be determined whether a target brake system has the malfunction by measuring a variation of one braking force between the left and right brake systems in which the malfunction is detected.

On the contrary, when the front-wheel friction braking force is not the same as the rear-wheel friction braking force, it may be detected which brake system has the malfunction between the front-wheel and rear-wheel braking systems by comparing the deceleration/acceleration actually reduced by braking the vehicle and the deceleration/acceleration value generated by performing braking of any one brake system of the front-wheel and rear-wheel brake systems of the left or right brake system in which the malfunction is detected.

Accordingly, when the yaw rate value is larger than 0, it is determined that the front-wheel right or rear-wheel right friction brake system has the malfunction (e.g., S470), and when it is determined that the front-wheel friction braking force and the rear-wheel friction braking force are the same or substantially the same as each other (e.g., S420), it is determined that the rear-wheel right friction brake system has the malfunction (e.g., S440) in the case where the deceleration/acceleration varies depending on the variation of the front-wheel right braking force (e.g., S430) and it is determined that the front-wheel right friction brake system has the malfunction (e.g., S460) in the case where the deceleration/acceleration does not vary depending on the variation of the front-wheel right braking force (e.g., S430).

When it is determined that the front-wheel friction braking force and the rear-wheel friction braking force are not the same as each other, in the case where the deceleration/acceleration actually reduced through braking of the vehicle is the same or substantially the same as the deceleration/acceleration generated by the front-wheel right friction brake system, it is determined that the rear-wheel right friction brake system has the malfunction and in the case where the deceleration/acceleration actually reduced through braking of the vehicle is not the same as the deceleration/acceleration generated by the front-wheel right friction brake system, it is determined that the front-wheel right friction brake system has the malfunction.

When the yaw rate value is smaller than 0, it is determined that the front-wheel left or rear wheel left friction brake system has the malfunction (e.g., S640) and it is determined whether the front-wheel friction braking force and the rear-wheel friction braking force are the same or substantially the same as each other (e.g., S600). In the case where the front-wheel friction braking force and the rear-wheel friction braking force are the same or substantially the same as each other, when the deceleration/acceleration varies depending on variation in front-wheel left braking force (e.g., S610), it is determined that the rear-wheel friction brake system has the malfunction (e.g., S620) and when the deceleration/acceleration does not vary depending on the front-wheel left braking force (e.g., S610), it is determined that the front-wheel left friction brake system has the malfunction (e.g., S630).

When the front-wheel friction braking force and the rear-wheel friction braking force are not the same as each other, in the case where the deceleration/acceleration actually reduced through braking of the vehicle is the same or substantially the same as the deceleration/acceleration generated by the front-wheel left friction brake system (e.g., S700), it is determined that the rear-wheel left friction brake system has the malfunction and in the case where the deceleration/acceleration actually reduced through braking of the vehicle is not the same as the deceleration/acceleration generated by the front-wheel left friction brake system, it is detected that the front-wheel left friction brake system has the malfunction (e.g., S720).

For convenience in explanation and accurate definition in the appended claims, the terms "left" or "right", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for detecting a malfunction of a brake system, the method comprising:
   measuring, by a deceleration sensor, a deceleration upon braking, in braking a vehicle; and
   determining, by a controller, whether the brake system has the malfunction by comparing the measured deceleration and a required deceleration, if a difference value between the required deceleration upon braking and the measured deceleration is equal to or more than a predetermined range, it is determined that the brake system has the malfunction,
   wherein if it is determined that the brake system has the malfunction, the determining, by the controller, of whether the brake system has the malfunction further includes:
   a1) determining, by the controller, whether a braking interval is an interval where braking is performed only through regenerative braking;
   a2) if the braking interval is the interval where braking is performed only through regenerative braking, determining, by the controller, that a regenerative brake system has the malfunction; and
   a3) if the braking interval is not the interval where braking is performed only through regenerative braking, determining, by the controller, whether a left friction brake system or a right friction brake system has the malfunction by using a yaw rate sensor measuring a yaw rate value and determining, by the controller, whether a front wheel friction brake system or a rear-wheel friction brake system has the malfunction by using the deceleration sensor having a measurement value of the deceleration.

2. The method of claim 1, wherein the braking interval is divided into a regenerative braking interval, a regenerative braking and rear-wheel friction braking interval, and a regenerative braking and front and rear-wheel friction braking interval.

3. The method of claim 1, wherein if it is determined that the brake system has the malfunction, the determining, by the controller, of whether the brake system has the malfunction further includes:
   b1) determining, by the controller, whether the braking interval is a regenerative braking and rear-wheel friction braking interval;
   b2) if the braking interval is the regenerative braking and rear-wheel friction braking interval, measuring the yaw rate value by the yaw rate sensor;
   b3) if the yaw rate value is zero, determining, by the controller, that the regenerative brake system has the malfunction;
   b4) if the yaw rate value is larger than zero, determining, by the controller, that the rear-wheel right friction brake system has the malfunction; and
   b5) if the yaw rate value is smaller than zero, determining, by the controller, that the rear-wheel left friction brake system has the malfunction.

4. The method of claim 1, wherein if it is determined that the brake system has the malfunction, the determining, by the controller, of whether the brake system has the malfunction further includes:
   c1) determining, by the controller, whether the braking interval is a regenerative braking and front and rear-wheel friction braking interval;
   c2) if it is determined that the braking interval is the regenerative braking and front and rear-wheel friction braking interval, measuring the yaw rate value by the yaw rate sensor;
   c3) if the yaw rate value is zero, determining, by the controller, that the regenerative brake system has the malfunction; and
   c4) if the yaw rate value is larger than zero, determining, by the controller, whether the front-wheel right friction brake system or the rear-wheel right friction brake system has the malfunction, wherein the determining of whether the front-wheel right friction brake system or the rear-wheel right friction brake system has the malfunction includes:

determining whether a front-wheel friction braking force and a rear-wheel friction braking force are substantially the same;

if it is determined that the front-wheel friction braking force and the rear-wheel friction braking force are substantially the same, determining whether the deceleration varies depending on a variation in the front-wheel right braking force;

if it is determined that the deceleration varies depending on the variation in the front-wheel right braking force, determining that the rear-wheel right friction brake system has the malfunction; and if it is determined that the deceleration does not vary depending on the variation in the front-wheel right braking force, determining that the front-wheel right friction brake system has the malfunction.

5. The method of claim 4, wherein the determining, by the controller, of whether the front-wheel right friction brake system or the rear-wheel right friction brake system has the malfunction further includes:

if the front-wheel friction braking force and the rear-wheel friction braking force are not the same, determining whether the deceleration actually reduced through braking and the deceleration generated by the front-wheel right friction brake system are substantially the same;

If the deceleration actually reduced through braking and the deceleration generated by the front-wheel right friction brake system are substantially the same, determining that the rear-wheel right friction brake system has the malfunction; and if the deceleration actually reduced through braking and the deceleration generated by the front-wheel right friction brake system are not the same, determining that the front-wheel right friction brake system has the malfunction.

6. The method of claim 4, wherein if the yaw rate value measured using the yaw rate sensor is smaller than zero, the determining, by the controller, of whether the brake system has the malfunction further includes:

determining whether the front-wheel left friction brake system or the rear-wheel left friction brake system has the malfunction, wherein if it is determined that the front-wheel friction braking force and the rear-wheel friction braking force are substantially the same, the determining of whether the front-wheel left friction brake system or the rear-wheel left friction brake system has the malfunction includes:

determining that the rear-wheel left friction brake system has the malfunction if the deceleration varies depending on the variation in the front-wheel left braking force, and determining that the front-wheel left friction brake system has the malfunction if the deceleration does not vary depending on the variation in the front-wheel left braking force.

7. The method of claim 6, wherein if it is determined that the front-wheel friction braking force and the rear-wheel friction braking force are not the same, the determining, by the controller, of whether the front-wheel left friction brake system or the rear-wheel left friction brake system has the malfunction includes:

determining whether the deceleration actually reduced through braking and the deceleration generated by the front-wheel left friction brake system are substantially the same, if the deceleration actually reduced through the braking and the deceleration generated by the front-wheel left friction brake system are substantially the same, determining that the rear-wheel left friction brake system has the malfunction, and if the deceleration actually reduced through the braking and the deceleration generated by the front-wheel left friction brake system are not the same, determining that the front-wheel left friction brake system has the malfunction.

* * * * *